US009386392B2

(12) United States Patent
Millen (10) Patent No.: US 9,386,392 B2
(45) Date of Patent: Jul. 5, 2016

(54) MEDIA CONTENT CONTROL MODULE AND PRESENTATION DEVICE

(75) Inventor: Samuel L. Millen, Somerville, MA (US)

(73) Assignee: Cue, Inc., Woburn, MA (US)

( * ) Notice: Subject to any disclaimer, the term of this patent is extended or adjusted under 35 U.S.C. 154(b) by 297 days.

(21) Appl. No.: 13/530,033

(22) Filed: Jun. 21, 2012

(65) Prior Publication Data

US 2013/0346642 A1 Dec. 26, 2013

(51) Int. Cl.
*G06F 9/38* (2006.01)
*H04W 4/00* (2009.01)
*H04W 4/18* (2009.01)

(52) U.S. Cl.
CPC .. *H04W 4/00* (2013.01); *H04W 4/18* (2013.01)

(58) Field of Classification Search
CPC .................................. H04W 4/00; H04W 4/18
USPC ........................................................... 710/20
See application file for complete search history.

(56) References Cited

U.S. PATENT DOCUMENTS

| 2003/0018581 | A1* | 1/2003 | Bratton et al. ................... 705/50 |
| 2007/0006268 | A1 | 1/2007 | Mandera et al. |
| 2008/0002951 | A1* | 1/2008 | Russ et al. ..................... 386/124 |
| 2009/0156251 | A1* | 6/2009 | Cannistraro et al. ........... 455/557 |
| 2009/0235321 | A1* | 9/2009 | Wu et al. ........................ 725/109 |
| 2009/0307730 | A1* | 12/2009 | Donaldson ............. H04N 7/163 725/76 |
| 2010/0138582 | A1* | 6/2010 | Bird et al. ..................... 710/303 |
| 2010/0220769 | A1 | 9/2010 | Sato |
| 2010/0292818 | A1 | 11/2010 | Ramsay |
| 2011/0145427 | A1* | 6/2011 | Amento et al. ................ 709/231 |
| 2011/0295974 | A1* | 12/2011 | Kashef et al. .................. 709/217 |
| 2012/0079092 | A1 | 3/2012 | Woxblom et al. |
| 2012/0151006 | A1* | 6/2012 | McInerney et al. ........... 709/219 |
| 2013/0121517 | A1* | 5/2013 | Anderson ...................... 381/321 |

FOREIGN PATENT DOCUMENTS

WO    2012057377 A1    5/2012

OTHER PUBLICATIONS

Xeo Loudspeaker System Press Release, Dynaudio International GmbH, Jan. 10, 2012 pp. 1-3.
Dream 360 system web page (http://drm360.com), printed Sep. 10, 2012, 2 pages.
Airport Express web page, Apple Inc. (http://ww.apple.com/airportexpress), printed Sep. 10, 2012, 7 pages.

(Continued)

*Primary Examiner* — Henry Tsai
*Assistant Examiner* — John Roche
(74) *Attorney, Agent, or Firm* — Fenwick & West LLP (57) ABSTRACT

An intermediary wireless device that wirelessly communicates media content. The intermediary wireless device includes a first wireless I/O interface configured to communicate with a media content source device using a first wireless protocol, a second wireless I/O interface configured to communicate with at least one media presentation device using a second wireless protocol, and control circuitry. The control circuitry is coupled to the first wireless I/O interface and to the second wireless I/O interface and configured to receive media data from the first wireless I/O interface, modify control information associated with the media data, and provide the media data with the modified control information to the at least one media presentation device through the second wireless I/O interface. A wireless media presentation device is also provided.

15 Claims, 3 Drawing Sheets

(56) References Cited

OTHER PUBLICATIONS

Airport Express Web page, Apple Inc. (http://www.apple.com/airportexpress/specs), printed Sep. 10, 2012, 3 pages.

International Search Report and Written Opinion from corresponding International Application No. PCT/US2013/47012 mailed Jan. 10, 2014.

Supplementary European Search Report for European Patent Application No. EP 13806615, Mar. 29, 2016, 8 Pages.

* cited by examiner

MEDIA CONTENT CONTROL MODULE AND PRESENTATION DEVICE

BACKGROUND OF THE INVENTION

Field of the Invention

Embodiments of the present invention are generally directed to a media content and control module, and more particularly to a media content and control module that communicates wirelessly with media content sources and media presentation devices.

SUMMARY OF THE INVENTION

In accordance with an aspect of the present invention, an intermediary wireless device is provided. The intermediary wireless device comprises a first wireless I/O interface configured to communicate with a media content source device using a first wireless protocol, a second wireless I/O interface configured to communicate with at least one media presentation device using a second wireless protocol, and control circuitry. The control circuitry is coupled to the first wireless I/O interface and to the second wireless I/O interface and configured to receive media data from the first wireless I/O interface, to modify control information associated with the media data, and to provide the media data with the modified control information to the at least one media presentation device through the second wireless I/O interface.

In accordance with one embodiment, the control information includes a volume level at which the media data is audibly presented. In another embodiment, the control information is received from at least one of a wireless remote control, the media content source device, and the at least one media presentation device. In accordance with a further aspect of this embodiment wherein the at least one media presentation device is an audio system that includes a plurality of speakers, one of the plurality of speakers wirelessly communicates the control information to at least one other speaker of the plurality of speakers.

In accordance with another embodiment wherein the media source device is a first media source device, the first wireless I/O interface can be further configured to communicate with a second media source device, distinct from the first media source device using a third wireless protocol. In accordance with an aspect of this embodiment, the first wireless protocol can be different, or the same as the third wireless protocol.

In accordance with an embodiment of the present invention, the first wireless protocol is a UPnP compatible protocol and the third wireless protocol is a DLNA compatible protocol. In another embodiment, the first wireless protocol is one of an AIRPLAY compatible protocol, a UPnP compatible protocol, and a DLNA compatible protocol and the second protocol is a PurePath compatible protocol.

In accordance with another aspect of the present invention, the intermediary wireless device is disposed in a housing that is configured to releasably attach to the at least one media presentation device. In accordance with an embodiment, at least one of the housing of the intermediary wireless device and a housing of the at least one media presentation device includes a plurality of attachment mechanisms configured to releasably attach the intermediary wireless device to the at least one media presentation device in only a single orientation.

In accordance with an embodiment of the present invention in which the media content source device is a first media content source device, the intermediary wireless device can further comprise a wired connection port configured to received media content from a second media content source device distinct from the first media content source device over a wired connection.

In accordance with another aspect of the present invention, a method of communicating media content from a media content source device to at least one media presentation device is provided. The method comprises wirelessly receiving the media content from the media content source device using a first wireless communication protocol, storing control information associated with the media content, and wirelessly transmitting the media content and the control information associated with the media content to the at least one media presentation device using a second wireless protocol that is different that the first wireless protocol.

In accordance with one embodiment, the method further comprises receiving the control information from a device that is other than the media content source and the at least one presentation device. In accordance with an aspect of this embodiment, the method may further comprise communicating the control information to at least one other wireless device that is distinct from the media content source, the at least one media presentation device, and the device that is other than the media content source and the at least one presentation device.

In accordance with an embodiment in which the at least one media presentation device is an audio presentation device that includes a plurality of speakers, the control information controls at least one of a volume level, a tone, and a balance of the plurality of speakers.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

There are various wireless technologies that enable the transmission, and in some instances, the control of media content, such as audio and video media content, on target presentation devices such as televisions, monitors, speakers, etc. These technologies have been well received because they often reduce the complexity and the aesthetic burden associated with wiring devices together. Many of these technologies and mediums are enabled by the advent of widespread digital storage and the use of digital media that allows media content to be communicated across the Internet and across local area networks (LANs) and personal area networks (PANs) between devices. These technologies also take advantage of digital communication protocols, such as Universal Plug and Play™ (UPnP™) developed by Intel and a variety of other solutions, such as Texas Instruments' Pure-Path™ technology that is a combination of hardware IC's, reference electrical designs for transmitters, receivers and antennas and associated software that allows for compressed and uncompressed analog and digital media to be transmitted along with concurrent non-media content between devices employing the same technology.

Most implementations of these technologies by various companies are somewhat inflexible and only partially address the needs of consumers. For example, self-amplified speaker systems exist that are based on proprietary wireless receiver technologies, such as the AIRPLAY technology provided by Apple®, but the source of the media content is limited to Apple® sourced devices such as the iPod™ or the iPhone™, or media player applications such as iTunes™. Other wireless sources, such as UPnP enabled devices like Android™ devices from Google are not compatible with the AIRPLAY technology and cannot interoperate to wirelessly send content for playback to such fixed function devices.

Other implementations permit a user to physically plug a media content source, such as an MP3 player, CD player, etc. into a device that then transmits the media content to wirelessly to target speakers or video playback devices. Still other 'dongle' type solutions are provided that communicate wirelessly with one another, however, in most of these solutions the media content source must be physically wired to the dongle transmitter and the media playback device must be physically wired to the dongle receiver. Such 'dongle' type solutions are necessarily limited to media content sources and media playback devices that have a connector that is compatible with those on the dongle transmitter and receiver.

Most of the above-described devices rely on point to point transmission technologies in which media content is broadcast from a transmitter to a receiver, but in which no control or management of the media content is provided. That is, control and management of the media content is either performed by the media content source device or the target media playback device. For example, where control of the media content includes volume control of audio media content, control of the volume is either performed on the media content source device (for example by increasing or decreasing the media content source signal level) or by the target media playback device (for example, by adjusting the amount of amplification performed on the received media content source signal).

In accordance with various embodiments of the present invention, a wireless media content and control module is provided that addresses one or more of the limitations of the above-described devices. In accordance with an aspect of the present invention, the wireless media content and control module is based on a flexible architecture in which the wireless media content and control module may be viewed as an intermediary device. That is, rather than relying on a point-to-point paradigm in which media content is transmitted from a media content source (i.e., point A) to a media playback device (i.e., point B), embodiments of the present invention may be used as an intermediate device that enables wireless communication of media content and control/management of that media content between a media content source and a media content presentation device, such as a display, television, or one or more audio output devices, such as a speaker. Embodiments of the present invention may therefore be used with a variety of different wireless source technologies and protocols, such as AIRPLAY, UPnP™, DLNA™ (Digital Living Network Alliance™), BlueTooth™, etc. The wireless media content and control module may be implemented in a modular manner, such that as different media content source devices and media content communication protocols become available, the media content and control module may be readily reconfigured. In accordance with one embodiment in which the wireless media content and control module is configured to communicate audio media content and control and management information to an audio presentation device, the wireless media content and control module may use Pure-Path™ wireless technology available from Texas Instruments to wirelessly communicate audio media content and control/management information to the audio presentation device. These and other aspects of embodiments of the present invention are now described below.

Figure 1:
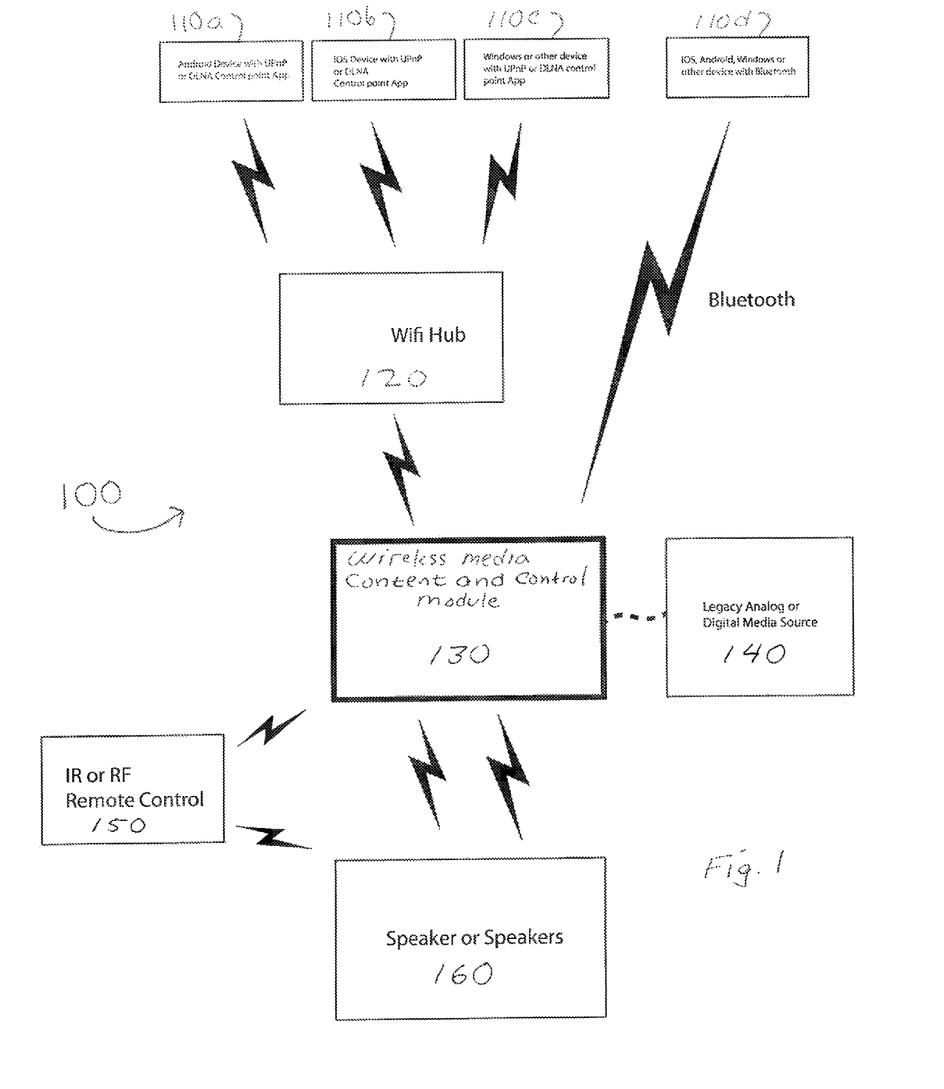
FIG. 1 illustrates a communication network that includes a wireless media content and control module and a media content presentation device in accordance with an aspect of the present invention.

FIG. 1 illustrates a communication network 100, such as a local area network (LAN) or a personal area network (PAN) that includes a wireless media content and control module 130 in accordance with an embodiment of the present invention. As shown, the communication network includes one or more wireless media content source devices 110 that are capable of wirelessly communicating media content, such as audio media content, video media content, or both audio and video content to another device. Some of the media content source devices may also be capable of wirelessly communicating state information to control the state (e.g., a volume level, whether the media content is paused, or muted, or fast forwarded or rewound) of the audio and/or video media content. The media content source devices 110 can include one or more of a variety of different types of media content source devices 110a-c that are capable of wirelessly communicating over a WiFi™ (IEEE 802.11) wireless communication network. Such WiFi™ devices can include an Android™ device 110a capable of wirelessly communicating media content using a UPnP™ or DLNA™ wireless communication protocol, an iOS™ device 110b capable of wirelessly communicating media content using a UPnP™ or DLNA™ wireless communication protocol, or a Windows™ or other computer device 110c capable of wirelessly communicating media content using a UPnP™ or DLNA™ wireless communication protocol. The media content source devices 110 can also include an iOS™, Android™, Windows™ or other device 110d capable of wirelessly communicating media content using a BlueTooth™ communication protocol, or an iOS™ device, such as an Apple iPad™, iPod™, or iPhone™ device (not shown) capable of wirelessly communicating media content using the AIRPLAY communication protocol.

As shown, the communication network 100 can include a WiFi™ Hub 120 that can wirelessly communicate over a WiFi™ network with each of the media content source devices 110a-c and with the wireless media content and control module 130. The wireless media content and control module 130 can also directly communicate wirelessly with media content source devices 110d using the BlueTooth™ protocol. As shown in FIG. 1, the wireless media content and control module 130 may also communicate with legacy analog or digital media content source devices 140 using a wired connection, such as a USB cable. In accordance with one embodiment of the present invention, a wireless remote control 150 can be provided to wirelessly communicate control and management information to the wireless media content and control module 130. The remote control may communicate with the wireless media content and control module using infra red (IR) technology, or Radio Frequency (RF) technology, such as BlueTooth™. The communication network 100 also includes one or more media content presentation devices 160, such as a video monitor, a television, one or more speakers, or a combination thereof. In accordance with one embodiment, the wireless media content and control module 130 wirelessly communicates with the media content presentation device 160 using PurePath™ technology.

Figure 2:
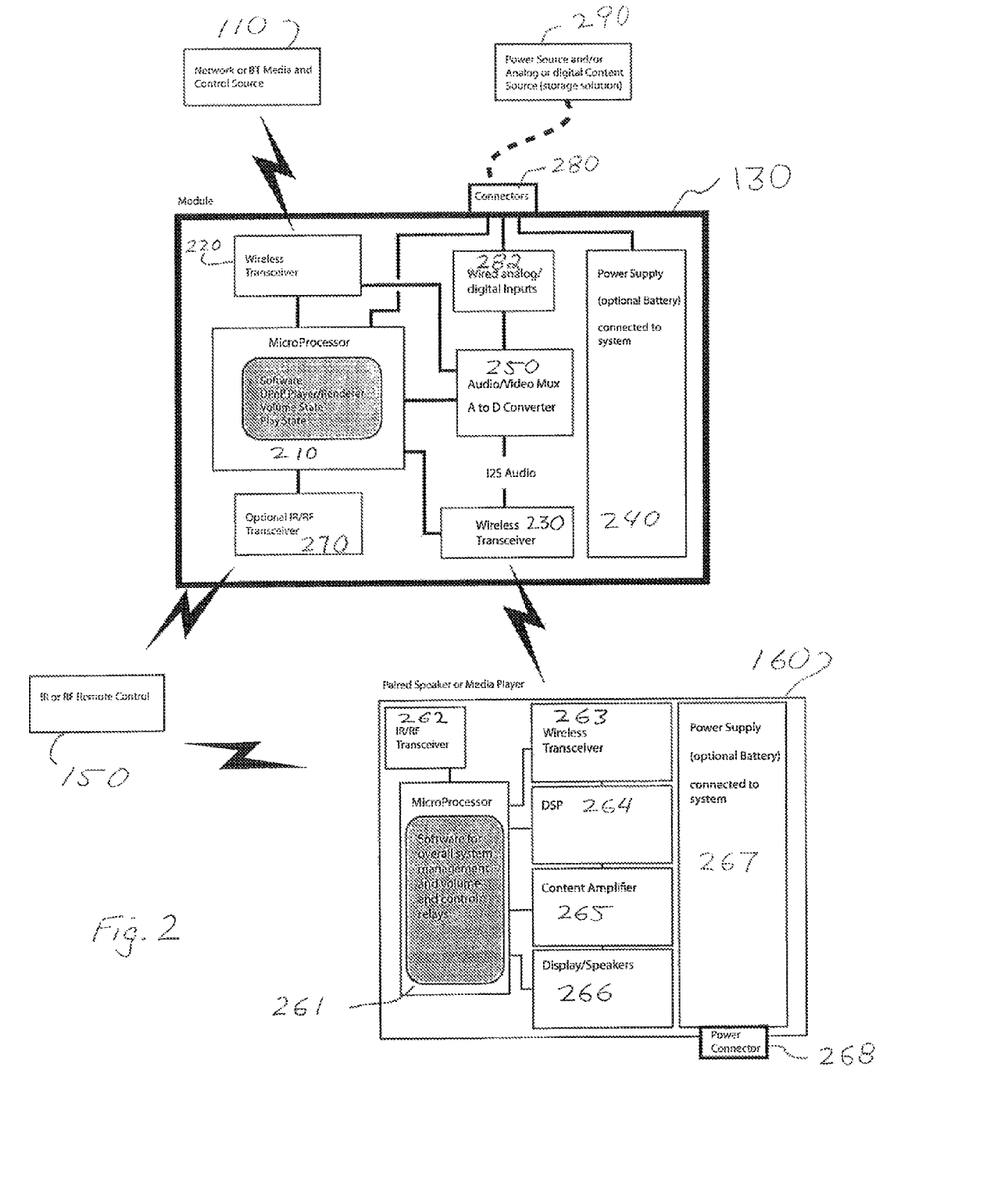
FIG. 2 is functional block diagram of the wireless media content and control module and the media content presentation device of FIG. 1 in accordance with an embodiment of the present invention.

FIG. 2 is a functional block diagram of a wireless media content and control module 130 and a media content presentation device 160 in accordance with an embodiment of the present invention. As shown in FIG. 2, the wireless media content and control module 130 receives media content, and in some instances, media content control and management information wirelessly from one or more WiFi™ or BlueTooth™ media content source devices 110. It should be appreciated that one or more of the media content source devices 110 may provide media content to the media content and control module 130 while another of the media content source devices provides media content control and management information to the media content and control module 130. The wireless media content and control module 130 includes a processor 210, such as microprocessor or other type of controller, that is communicatively coupled (for example, via a bus) to a first wireless I/O (Input/Output) interface 220, such as an 802.11 compatible wireless transceiver, a second wireless I/O interface 230, such as a PurePath™ compatible wireless transceiver, an audio/video multiplexer and Analog to Digital (A/D) converter 250, an optional third wireless interface 270, such as an IR/RF transceiver, and one or more connectors 280 configured to receive power and/or analog or digital media content from an analog or digital media content source 290, such as a legacy analog or digital media content source 140 (FIG. 1). The term I/O interface is used herein to indicate that the interface is capable of being used as an input, as an output, or as both an input and an output to communicate with other media content source or media content presentation devices. It should be appreciated that although only a single processor 210 is depicted in FIG. 2, the processor 210 may include multiple processors each associated with different tasks, for example a front end communication protocol processor and another more general purpose control processor. It should also be appreciated that although the Audio/Video multiplexer and A/D converter 250 is illustrated as a single functional block, the Audio/Video multiplexing functionality may be implemented in a separate component or functional software module from the analog to digital conversion.

Although not depicted as being coupled to the processor 210 or the other electrical components of the wireless media content and control module 130, the wireless media content and control module includes a power supply 240 that is electrically coupled to the processor 210 and the other electrical components to provide power. The power supply 240 may be a conventional AC/DC power supply that provides DC power to the wireless media content and control module 130, or a DC power supply that receives DC power via one or more of the connectors 280 from an external device (such as the analog or digital media content source 290, or as discussed in more detail below, the media content presentation device 160), such as via a USB connector. The power supply 240 may optionally include one or more batteries to provide power to the module 130, for example, in the event that the media content and control module is not presently plugged into a source of power.

In operation, the wireless media content and control module 130 receives media content and/or media content control or management information from one or more of the media content source devices 110 via the WiFi™ hub 120 over the first wireless I/O interface 220. The processor 210 receives the media content and/or the media control or management information and provides the media content to the Audio/Video multiplexer and A/D converter 250 that demultiplexes the audio media content from the video media content. The processor 210 then provides the demultiplexed audio and video media content and any media content and control or management information to the second I/O interface 230 that wirelessly communicates the audio and/or video media content and media content control or management information to the media content presentation device 160. Where the media content is provided via a wired connection (for example USB) over one or more of the connectors 280, for example, from a legacy media content source 140, that media content may be converted to a digital format, where necessary, by the Audio/Video multiplexer and A/D converter prior to being provided to the second wireless I/O interface 230. It should be appreciated that the legacy media content source could include a USB memory stick with media content stored thereon.

In accordance with an aspect of the present invention, the wireless media content and control module 130 is capable of managing (adjusting and storing) media content control and management information and communicating media content control and management information to the media content presentation device 160, where such information is received from a media content source device 110. For example, with respect to audio media content, such media content control and management information may include volume control or state information, such as the current volume level, the playback state of the media content (e.g., paused, muted, fast-forward, etc.), the source of the media content (where multiple media content sources are present), changes in the status of media content sources, etc. Where the media content source device is capable of communicating media content control and management information, the status (e.g., the current status) and changes in status of the media presentation device 160 may be communicated back to the wirelessly connected media content source device, or to each wirelessly connected media content source device capable of receiving such information.

Where the media content source device does not have the capability of communicating media content control and management information, such information may alternatively be provided to the wireless media content and control module 130 by the wireless remote control 150, or by another wireless media content source device 110. In accordance with one embodiment of the present invention, the media content control and management information provided by the remote control 150 can include volume control and/or state information, such as the desired volume level, the playback state of the media content (paused, muted, etc.), the source of the media content (where multiple sources are present), etc. In accordance with this aspect of the present invention, the wireless media content and control module 130 may thus act as a master media content source device controller that can accept media content from wired or wireless devices and control the presentation of that media content on one or more target media presentation devices, as well as maintain a current status of the target media presentation devices.

In accordance with an embodiment of the present invention, the media content presentation device 160 includes a processor 261 that is communicatively coupled (for example, via a bus) to a first wireless interface 262, such as an IR/RF transceiver, a second wireless I/O interface 263, such as a PurePath™ wireless transceiver, a Digital Signal Processor (DSP) 264, a media content amplifier 265, and a presentation output device 266, such as a display or one or more speakers. Although not depicted as being coupled to the processor 261 or the other electrical components of the media content presentation device 160, the media content presentation device includes a power supply 267 that is electrically coupled to the processor 261 and the other electrical components to provide power. The power supply 267 may be a conventional AC/DC power supply that provides DC power to the media presentation device 160. In accordance with an embodiment of the present invention, the media content presentation device 160 may include a power connector 268 that is electrically coupled to the power supply 267 to provide DC power to one of the connectors 280 of the media content and control module 130, as described in more detail with respect to FIG. 3 below. The power supply 240 may optionally include one or more batteries to provide power to the media content presentation device 160.

In operation, the media content and media content control and management information is received from the media content and control module 130 via the second wireless I/O interface 263. Media content control and management information may also be received directly from the wireless remote control 150, where this information may be provided to the media content and control module 130. The processor 261 provides the media content to the DSP 264 that processes the media content as instructed by the processor 261 in accordance with the media content control and management information received by the processor. The processed media content is provided to the media content amplifier 265 that amplifies the media content and provides the amplified media content to the presentation output device 266. In accordance with one embodiment of the present invention in which the media content presentation device 160 is an audio presentation device, the volume of the audio presentation device may be directly controlled in the media content presentation device. That is, in contrast to devices that control the volume of a presentation output device by modulating the amplitude of the input signal, the media presentation device 160 instead modulates the volume of the media content by adjusting the amplitude of the output signal provided by the DSP 264 and/or the media content amplifier 265.

In accordance with a further aspect of the present invention, the media content and control module may be configured (either during manufacture, or during an initial configuration routine) to be aware of the capabilities and limitations of a particular media content presentation device 160 to which it is paired. For example, where the media presentation device 160 is an audio presentation device, such as a surround sound system, the media content and control module may be made aware of the capabilities and limitations of the audio presentation device. Such capabilities may include the type and number of speakers and their location designation (e.g., a sub-woofer, a mid-range speaker or a high frequency speaker, whether the speaker is designated as a left channel speaker, a right channel speaker, and/or front or back, the output limitations of the speakers in terms of their minimum input signal level, their maximum input signal level, etc.) Alternatively, the processor 261 may be configured to store information relating to the capabilities and limitations of the audio presentation device, and control the DSP and/or the media content amplifier based upon this stored information and the media content control and management information received from the media content and control module 130.

According to one embodiment in which the media content presentation device is an audio device, such as one or more speakers, and the media content is audio content, the wireless media content and control module 130 may act as a master controller that controls characteristics of the presented audio content, such as volume, tone, balance, etc. For example, the wireless media content and control module 130 may receive volume control signals from the media content source device or another remote volume control device (such as the remote 150, or the media presentation device 160 itself), and relay the volume control signals to the speaker(s) to control the volume of the audio content. The wireless media content and control module 130 may receive acknowledgement signals from the speaker(s) confirming that the volume control signals have been received. In one example, where the wireless media content and control module 130 receives volume control signals from one component in the network 100 (such as the media content source device 110, for example), the wireless media content and control module 130 may further provide volume control information to any other volume-controlling devices in the network 100. In this manner, all devices in the network 100 which may be used to control the volume of the audio content presented by the speaker(s) may have common volume information, such that the volume of the presented audio may be seamlessly controlled through any device.

Figure 3:
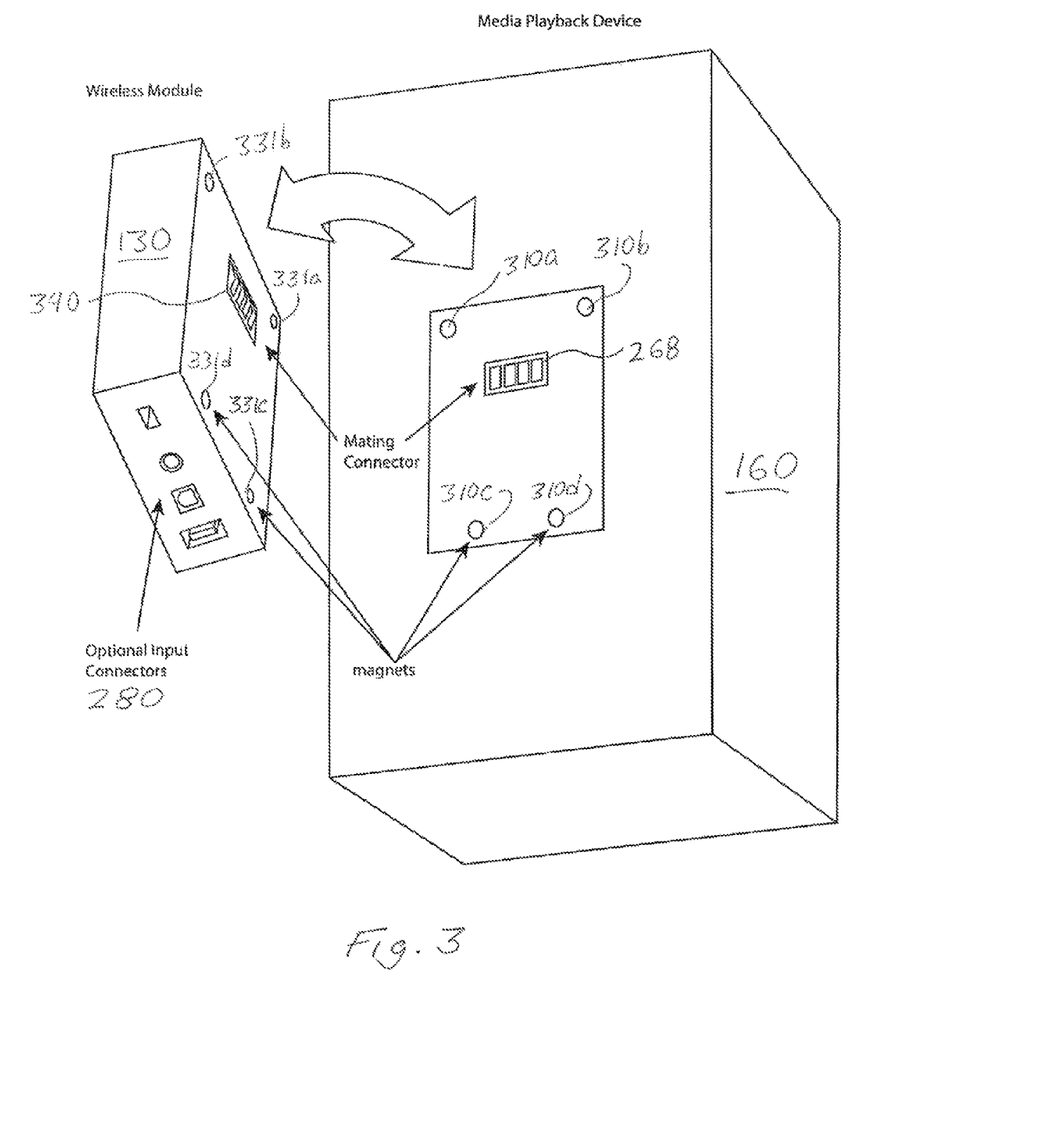
FIG. 3 is a perspective view of the wireless media content and control module and the media content presentation device of FIGS. 1 and 2 in accordance with an embodiment of the present invention.

FIG. 3 illustrates a media content presentation device in accordance with an embodiment of the present invention. As illustrated in FIG. 3, in one embodiment, the media content presentation device 160 is configured as an audio media content presentation device, such as a speaker. As shown, the media presentation device 160 includes a power connector 268 by which power provided by the power supply 267 (FIG. 2) of the media content presentation device 160 may be provided to the wireless media content and control module 130. The power connector 268 is located on an external surface of the media content presentation device, such as on a rear surface (as shown) or a bottom surface of the media content presentation device that is relatively shielded from view. In accordance with one embodiment, the power connector may be a Bourne™-style face-to-face connector that is configured to mate with a compatible Bourne-style connector 340 of the wireless media content and control module 130, as shown in FIG. 3. As known to those skilled in the art, a Bourne™-style connection typically includes one connector that has one or more male spring contacts disposed on one of the connectors (e.g., connector 340) and one or more female contacts (i.e., pads) on the other mating connector (e.g., connector 268.) The connector 340 may be one of the connectors 280 functionally depicted in FIG. 2. The contacts of the connectors 268, 340 may include a pair of contacts for serial communication in addition to contacts providing power and ground.

Surrounding the power connector 268 are a plurality of attachment mechanisms 310*a*-310*d* that permit the wireless media content and control module 130 to be attached to the media content presentation device 160. It should be appreciated that the plurality of attachment mechanisms can also permit the wireless media content and control module 130 to be easily attached to devices other than the media content presentation device 160 as well. The wireless media content and control module 130 includes a plurality of mating attachment mechanisms 331*a*-331*d* that are configured to mate with a respective one of the plurality of attachment mechanisms 310*a*-310*d*. In one implementation, one of the plurality of attachment mechanisms 310*a*-310*d*, 331*a*-331*d* may include a plurality of magnets, and the other a plurality of ferrous metal screws. In another implementation, each of the plurality of attachment mechanisms 310a-310d, 331a-331d includes a plurality of magnets having different polarities and arranged in an asymmetric manner as shown, such that the wireless media content and control module can only be attached to the media presentation device in a single orientation. It should be appreciated that a myriad of other types of attachment may be used, as the present invention is not limited to a particular type of attachment mechanism. For example, one of the plurality of attachment mechanisms 310a-310d, 331a-33d may include a plurality of one type of hook and loop fasteners, and the other a plurality of the other mating type of hook and loop fasteners. Alternatively still, one of the plurality of attachment mechanisms 310a-310d, 331a-33d may include a plurality of magnets, and the other may simply include a ferrous metal plate.

As shown in FIG. 3, the connectors 280 on the wireless media content and control module 130 may include a plurality of different types of connectors, such as a USB connector, a dedicated DC power connector, an optical connector, etc. The connectors 280 may be disposed on an external surface of the wireless media content and control module in a manner that does not interfere with the power connector 268 and the connector 340

In accordance with an aspect of the present invention and as described above, a wireless media content and control module is provided that enables significantly greater functionality and flexibility with a wide variety of media content source devices. Embodiments of the present invention provide a modular design that is functionally compatible with a variety of different wireless media content source options, both open and proprietary, such as AIRPLAY from Apple™ UPnP™ DLNA™, or Bluetooth™, or any others that can wirelessly communicate media content of a WiFi™ or Bluetooth™ network. Embodiments of the present invention are also compatible with legacy wired media content source devices.

In accordance with another aspect of the present invention, the wireless media content and control module can be wirelessly "paired" with one or more target media content presentation devices that share the same wireless communication technology and protocol, such as PurePath™. Where the one or more target media content presentation devices include a surround sound system that includes multiple speakers, the use of wireless technology dispenses with the need for complex wiring schemes, setup and configuration.

In accordance with yet another aspect of the present invention, the wireless media content and control module can act as a master media content source device controller that can control the volume and presentation of media content, even where the media content source devices lack the ability to control the presentation of the media content themselves.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. An intermediary wireless device comprising:
a first wireless I/O interface configured to wirelessly communicate with a media content source device using a first wireless protocol;
a second wireless I/O interface configured to wirelessly communicate with a plurality of media presentation devices using a second wireless protocol that is different than the first wireless protocol;
control circuitry coupled to the first wireless I/O interface and to the second wireless I/O interface, and configured to:
receive media data and associated control information from the media content source device via the first wireless I/O interface,
transmit the media data and the associated control information via the second wireless I/O interface to a plurality of media presentation devices to present the media data according to the associated control information;
receive from one of the plurality of media presentation devices a control signal to change the control information;
modify the control information associated with the media data according to the control signal,
transmit the modified control information to the plurality of media presentation devices via the second wireless I/O interface to present the media data according to the modified control information, and
transmit the modified control information to the media content source device via the first wireless I/O interface.

2. The intermediary wireless device of claim 1, wherein the modified control information includes a volume level at which the media data is audibly presented.

3. The intermediary wireless device of claim 1, wherein the one media source device is a first media content source device, and wherein the first wireless I/O interface is further configured to wirelessly communicate with a second media content source device, distinct from the first media content source device, using a third wireless protocol that is different than the first wireless protocol.

4. The intermediary wireless device of claim 1, wherein the first wireless protocol is a UPnP compatible protocol and the second wireless protocol is a proprietary wireless protocol.

5. The intermediary wireless device of claim 4, wherein the second protocol is a PurePath compatible protocol.

6. The intermediary wireless device of claim 1, wherein at least one media presentation device has an external surface, and the intermediary wireless device is disposed in a housing having an external surface, wherein the external surface of the housing configured to releasably attach to the external surface of the at least one media presentation device.

7. The intermediary wireless device of claim 6, wherein the external surface of the housing of the intermediary wireless device includes a plurality of attachment mechanisms configured to releasably attach the intermediary wireless device to the external surface of at least one media presentation device in only a single orientation.

8. The intermediary wireless device of claim 1, wherein the intermediary wireless device further comprises:
a wired connection port configured to receive media content over a wired connection.

9. A method of communicating media content from a media content source device to a plurality of media presentation devices, comprising:
wirelessly receiving, in an intermediary wireless device that is physically distinct from the at least one media content source device and the plurality of media presentation devices, the media content and associated control information received from the media content source device using a first wireless communication protocol;
transmitting from the intermediary device, using a second wireless protocol that is different than the first wireless protocol, the media data and the associated control information to a plurality of media presentation devices to present the media data according to the associated control information;

receiving in the intermediary device from one of the plurality of media presentation devices using the second wireless protocol, a control signal to change the control information;

modifying the control information associated with the media content in the intermediary wireless device according to the control signal and storing the modified control information in the intermediary wireless device;

wirelessly transmitting the media content and the modified control information associated with the media content from the intermediary wireless device to the plurality of media presentation devices using the second wireless protocol to present the media data according to the modified control information; and wirelessly transmitting the modified control information from the intermediary wireless device to the media content source device using the first wireless communication protocol.

10. The method of claim 9, wherein the plurality of media presentation devices comprises a plurality of speakers, and wherein the modified control information controls at least one of a volume level, a tone, and a balance of the plurality of speakers.

11. The method of claim 9, further comprising wirelessly transmitting the modified control information from the intermediary wireless device to each of a plurality of media content source devices.

12. The method of claim 9, further comprising:

wirelessly receiving, in the intermediary wireless device, an acknowledgement of receipt of the modified control information from the at least one media presentation device; and wirelessly transmitting the modified control information from the intermediary wireless device to each of a plurality of media content source devices.

13. The method of claim 9, wherein the media content includes audio media content and video media content, the method further comprising demultiplexing, in the intermediary wireless device, the audio media content from the video media content prior to wirelessly transmitting the media content and the modified control information from the wireless intermediary device to the at least one media presentation device.

14. The intermediary wireless device of claim 1, wherein the control circuitry is further configured to provide the modified control information to each of a plurality of media content source devices via the first wireless I/O interface.

15. The intermediary wireless device of claim 1, further comprising an audio/video multiplexer coupled to the first wireless I/O interface and the second wireless I/O interface, the audio/video multiplexer being configured to receive the media data, and demultiplex audio media data from video media data.

* * * * *